United States Patent [19]

Sarangapani

[11] Patent Number: 5,752,207
[45] Date of Patent: May 12, 1998

[54] METHOD AND APPARATUS FOR DETERMINING A PATH FOR A MACHINE BETWEEN A PREDETERMINED ROUTE AND A FINAL POSITION

[75] Inventor: Jagannathan Sarangapani, Peoria, Ill.

[73] Assignee: Caterpillar Inc., Peoria, Ill.

[21] Appl. No.: 536,761

[22] Filed: Sep. 29, 1995

[51] Int. Cl.$^6$ ........................................ G06F 17/00
[52] U.S. Cl. ........................................ 701/26; 701/210
[58] Field of Search ............... 364/424.027, 424.028, 364/424.029, 424.031, 443, 444.1, 444.2, 449.3, 449.4; 701/23, 24, 25, 26, 200, 201, 202, 209, 210

[56] References Cited

U.S. PATENT DOCUMENTS

| | | | |
|---|---|---|---|
| 4,727,492 | 2/1988 | Reeve et al. | 364/424.029 |
| 4,817,000 | 3/1989 | Eberhardt | 364/443 |
| 4,939,650 | 7/1990 | Nishikawa | 364/424.031 |
| 5,109,340 | 4/1992 | Kanayama | 364/424.029 |

FOREIGN PATENT DOCUMENTS

| | | |
|---|---|---|
| 0394517 | 10/1990 | European Pat. Off. . |
| 2276452 | 9/1994 | United Kingdom . |
| 2294136 | 4/1996 | United Kingdom . |

OTHER PUBLICATIONS

Robotica (1994) vol. 12, pp. 52., "Path Planning and Control of a Mobile Base with Nonholonomic constraints" by Jagannathan,Zhu, & Lewis.

*Primary Examiner*—Kevin J. Teska
*Assistant Examiner*—Edward J. Pipala
*Attorney, Agent, or Firm*—James R. Yee

[57] ABSTRACT

A method and apparatus for automatically determining and modeling a path between a route and a final position is provided. An initial position on the route and a set of path equations between the initial position and the final position are determined. A set of path data points is computed using the set of path equations and the path as defined by the path data points is modeled. The curvature of the path at each point is determined using the model and validated against a reference curvature.

8 Claims, 5 Drawing Sheets

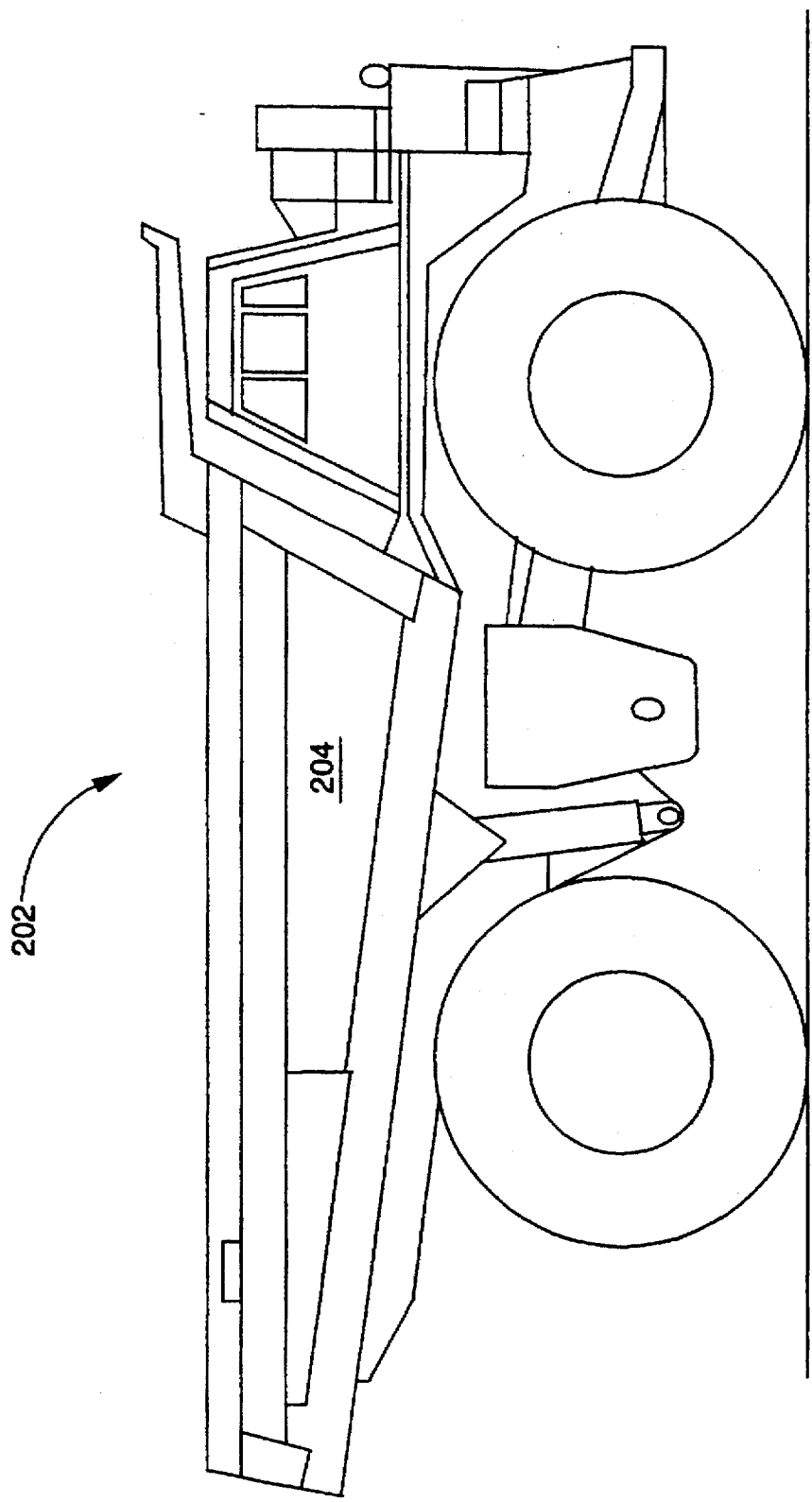
Fig-2-

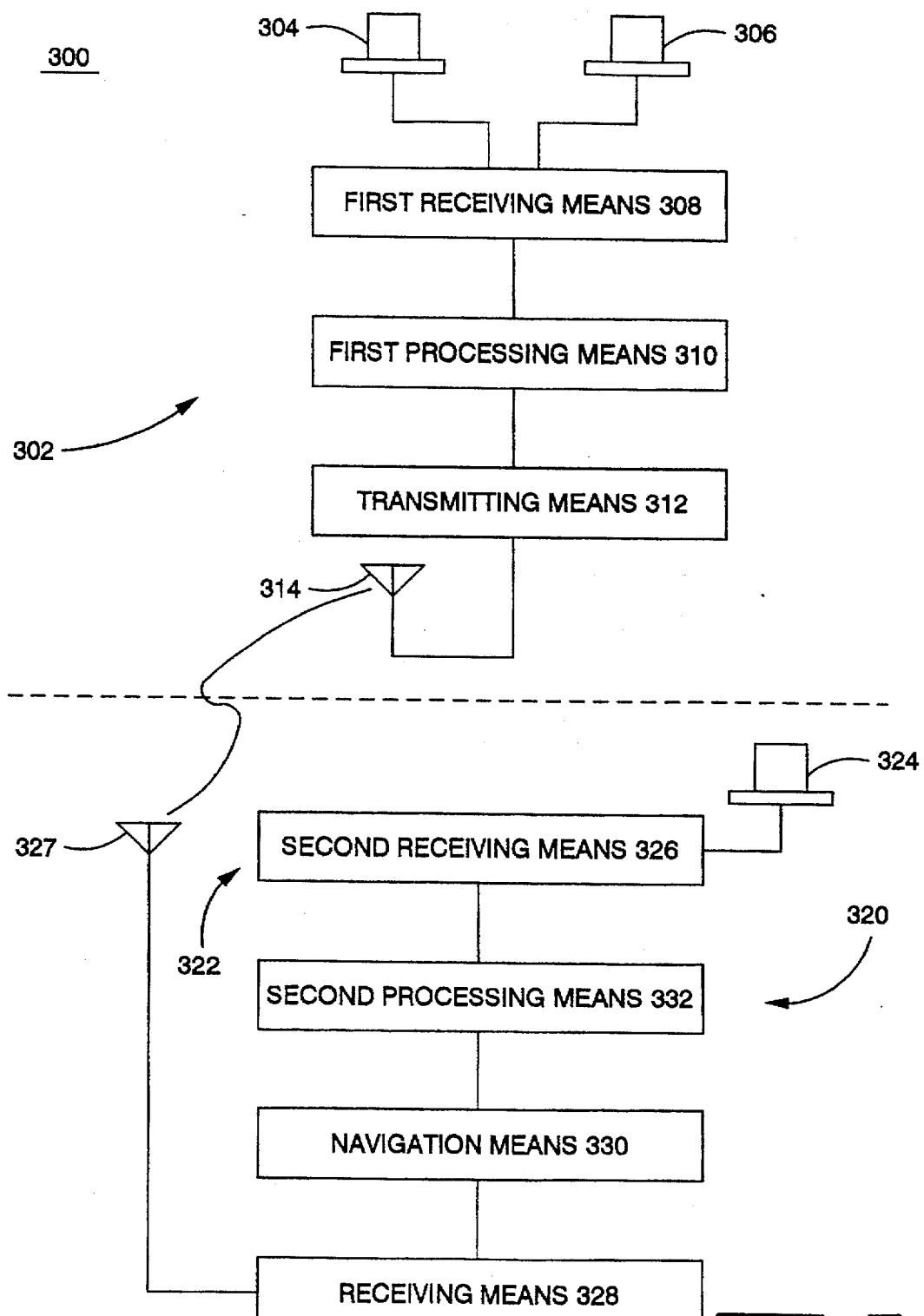
Fig_3

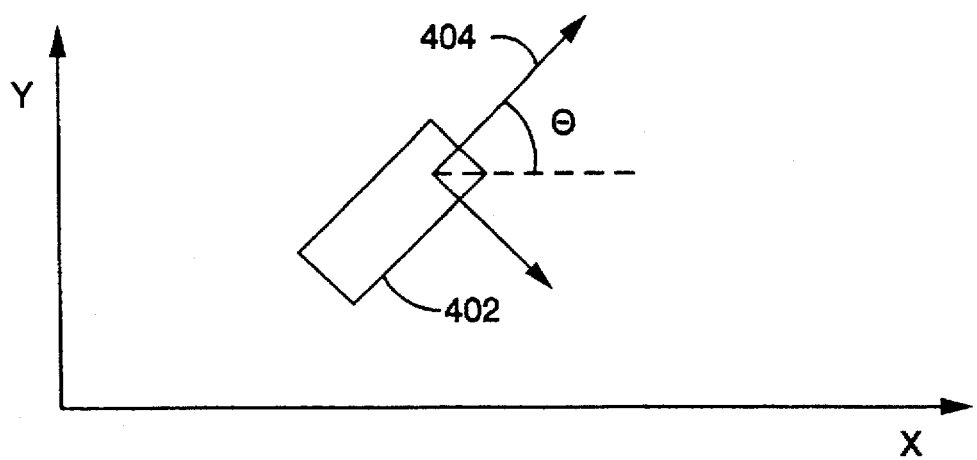
Fig_4_
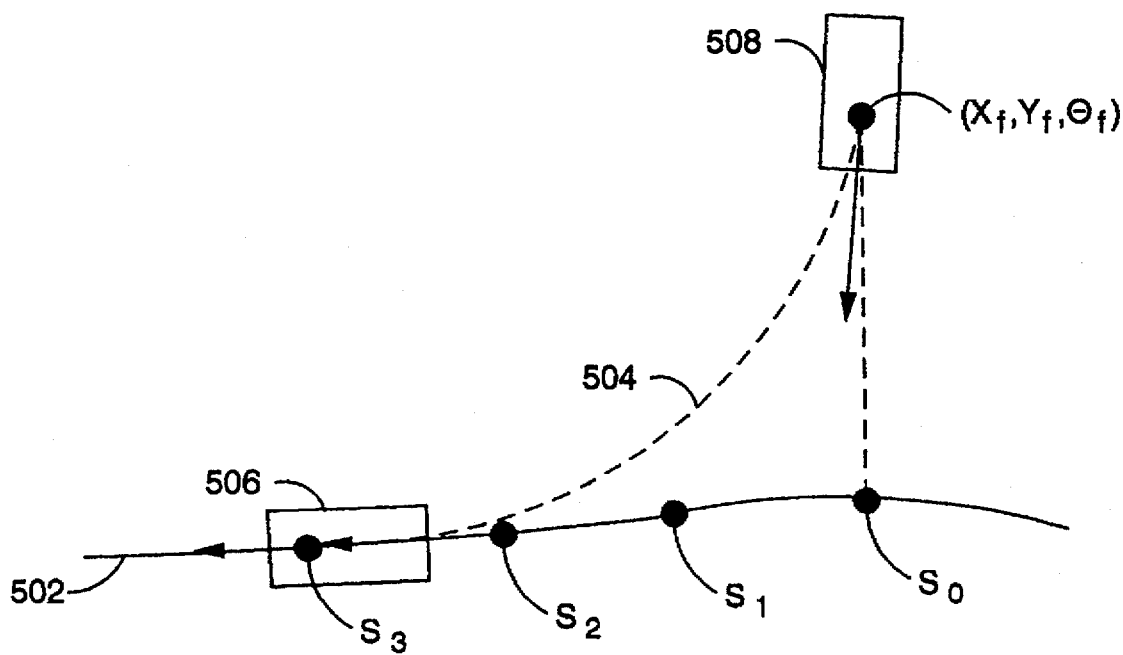
Fig_5_

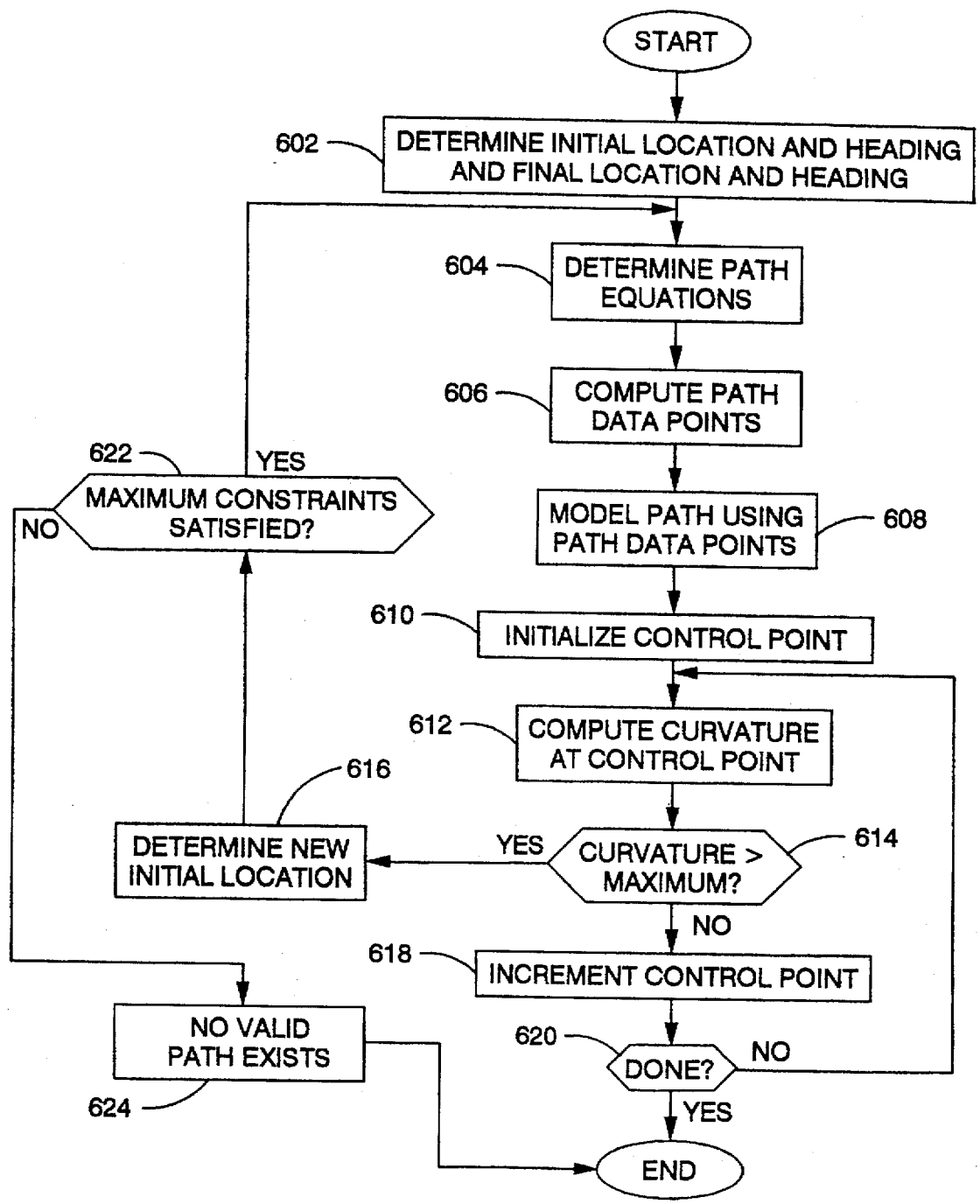
Fig_6_

METHOD AND APPARATUS FOR DETERMINING A PATH FOR A MACHINE BETWEEN A PREDETERMINED ROUTE AND A FINAL POSITION

TECHNICAL FIELD

This invention relates generally to autonomous systems, and more particularly, to a method for determining the path for a machine with nonholonomic constraints.

BACKGROUND

In the earthmoving industry, there has been recent research and development in the automation of earthmoving machines. For example, U.S. Pat. No. 5,375,059 issued on Dec. 20, 1994 to Kyrtsos et al ('059) discloses a system and method for providing an autonomous machine. The autonomous machines follow predetermined routes. The machines' position is checked and corrected using the Global Positioning System (GPS). Generally, the routes are predetermined. For example, in '059 the routes are generally determined by driving the truck over the desired route and taking position readings. The predetermined route is then determined using the position readings.

During the machine's operation, the machine may be required to traverse a path or path segment which is not a part of the predetermined route. For example, assume the machine traversing the route is a hauling machine which is to be loaded by a loading machine. In order for the loading machine to load the hauling machine in the most efficient manner, it would be desirable for the hauling machine to be positioned at a specific location with a particular heading.

However, the desired location changes depending on the location of the loading machine and its operation. Thus, the desired position of the hauling machine and therefore the path segment to the desired position cannot be predetermined by driving the machine over the route.

Additionally, planning such a path or path segment must satisfy the heading constraints, i.e., the path segment must begin at an initial position (location and heading) and end at the desired location with the desired heading.

The present invention is directed to overcoming one or more of the problems, as set forth above.

DISCLOSURE OF THE INVENTION

In one aspect of the present invention, a method for automatically determining and modeling a path between a route and a final position is provided. The final position includes a final location and a final heading. The method includes the steps of determining an initial position on the route, determining a set of path equations between the initial position and the final position, computing a set of path data points using the set of path equations, and determining a model of the path as defined by the path data points. The initial position includes an initial location and an initial heading. The method also includes the steps of determining the curvature of the path at each of the path data points using the model and determining an other initial position and path if the curvature at any path data point is greater than a predetermined curvature.

In another aspect of the present invention, an apparatus for automatically determining and modeling a path between a route and a final position is provided. The final position includes a final location and a final heading. The apparatus generates a final position signal indicative of the final position and determines an initial position on the route. The initial position includes an initial location and an initial heading. The apparatus computes a set of path data points between the initial position and the final position; models the path defined by said path data points, determines the curvature of the path at each path data point using the model; and determines an other initial position and an other path using the other initial position if the curvature at any path data point is greater than a predetermined curvature.

BRIEF DESCRIPTION OF THE DRAWINGS

FIG. 2 is a diagrammatic illustration of a second earthmoving machine, shown as an off highway truck;

FIG. 3 is a block diagram of an apparatus for determining a path for a machine between a predetermined route and a final position, according to an embodiment of the present invention;

FIG. 4 is a block diagram illustrating the desired heading and location of an earthmoving machine;

FIG. 5 is a block diagram illustrating a predetermined route and the determined route between the second machine and the predetermined route; and, FIG. 6 is a flow diagram illustrating operation of the apparatus of FIG. 3; according to an embodiment of the present invention.

BEST MODE FOR CARRYING OUT THE INVENTION

Figure 1:
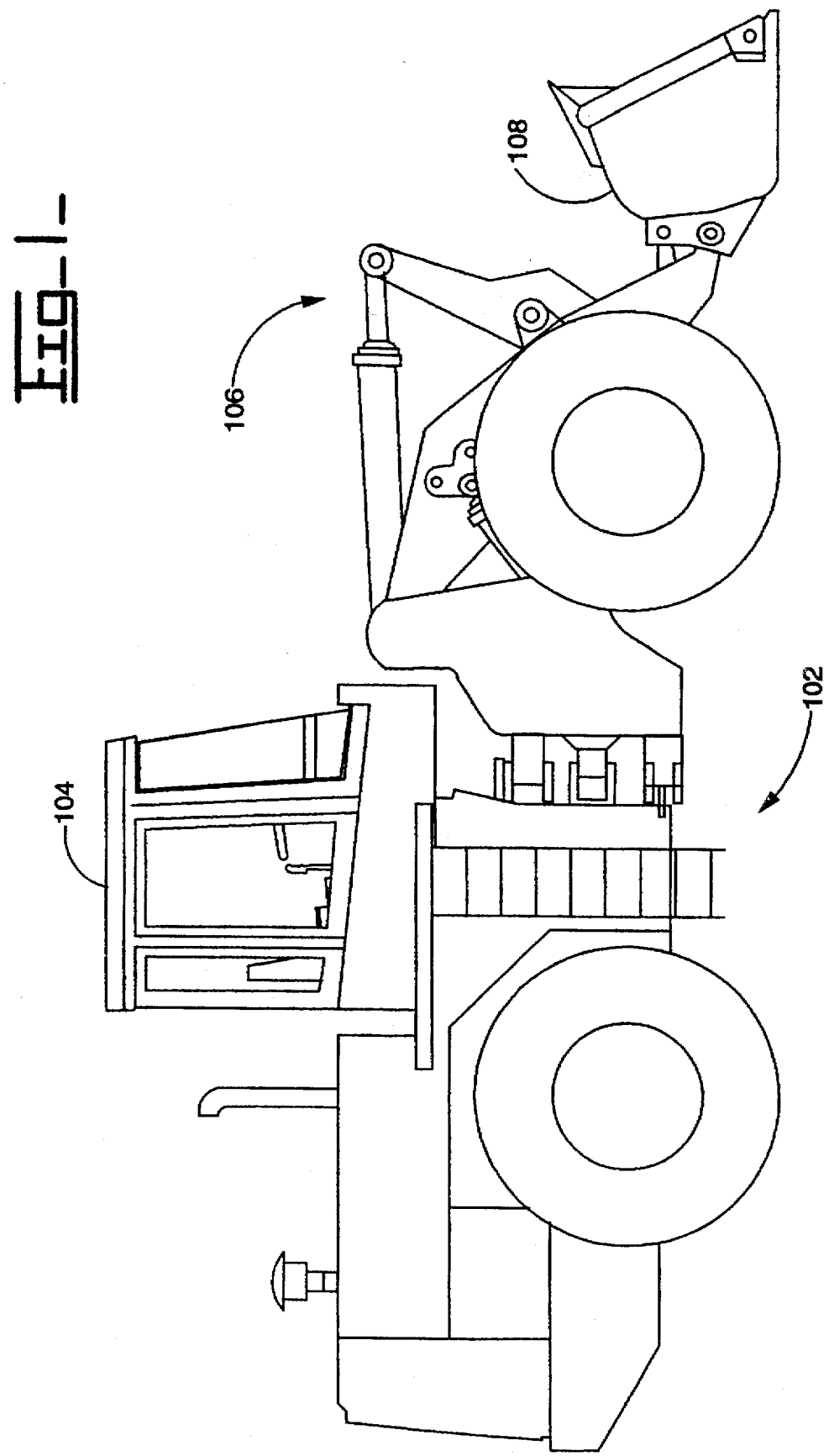
FIG. 1 is a diagrammatic illustration of a first earthmoving machine, shown as a wheel loader.

With reference to the FIGS. 1–6, the present invention provides a system 300 for use in an autonomous or semi-autonomous mine site. The system 300 includes at least two machines. For purposes of discussion, the following discussion will include a loading machine 102, for example a wheel loader (WL), and a hauling machine 202, for example an off-highway truck.

With particular reference to FIG. 1, an illustration of a wheel loader 102 is shown. The wheel loader 102 includes an operator's cab 104 and a work implement 106. The work implement 106 is adapted for digging/loading material and dumping into the hauling machine 202. In the preferred embodiment, the work implement 106 includes a bucket 108. While the following discussion refers to the loading machine 102 as a wheel loader it is to be realized that other types of loading machines, for example, an excavator or shovel, may be substituted without departing from the spirit of the present invention.

With particular reference to FIG. 2 an illustration of an off-highway truck (OHT) 202 is shown. The OHT 202 includes a truck bed 204 for storing, carrying, and transporting loaded material.

With particular reference to FIG. 3, the present invention provides an apparatus and method for automatically determining the path between a predetermined route and a desired or final position. The desired position includes a desired location, preferably in Cartesian coordinates and a desired heading $(x_f, y_f, \Theta_f)$.

The system 300 includes a first positioning means 302 for determining the position of the loading machine 102 and responsively producing a first position signal.

In the preferred embodiment, the first positioning means 302 incorporates a Global Positioning System (GPS). The first positioning means 302 receives signals from a constellation of man-made satellites orbiting the Earth and determines position relative to the Earth by means of triangulation. Preferably, the U.S. Government's NAVISTAR GPS satellites are used.

The first positioning means 302 includes first and second GPS antennas 304,306. The first and second GPS antennas 304,306 are mounted on the operator's cab 104 of the loading machine 102 at two known locations, separated by a known distance.

The first positioning means 302 includes a first receiving means 308. The first receiving means 308 is coupled to the first and second GPS antennas 304,306 and is adapted to determine the terrestrial position of the loading machine 102.

In one embodiment, the first receiving means 308 includes two GPS receivers, one connected to each of the first and second GPS antennas 304,306. Each GPS receiver determines the terrestrial position of a respective antenna 304,306.

In another embodiment, the first receiving means 308 includes a single GPS receiver connected to both the first and second GPS antennas 304,306. The GPS receiver switches between each antenna and alternately determines the position of each.

Preferably, the terrestrial position of the loading machine 102 is defined as the center of the bucket of the loading machine 102. Thus, the first receiving means 308 translates the determined position of at least one of the antennas into the position of the center of the bucket. This is accomplished using the known geometry of the loading machine and the relative positions of the linkage which connects the bucket to the loading machine. The geometry of the linkage is determined by at least one linear or rotary position sensor (not shown).

In addition, by determining the terrestrial position of both the first and second GPS antennas 304,306, the heading (orientation) of the loading machine can be determined.

In the preferred embodiment, the first GPS receiving means 308 also includes a microprocessor based controller for receiving signals from the GPS receiver(s) and responsively determining the terrestrial position and heading of the loading machine 102. The controller may also be adapted to receive signals from one or more pseudolites and/or a base station in order to increase the accuracy of position determinations. One suitable GPS system is disclosed in U.S. Pat. No. 5,375,059 issued Dec. 20, 1994 to Kyrtsos et al, titled "Vehicle Position Determination System and Method".

In the preferred embodiment, the system 300 also includes a first processing means 310 for receiving the first position signal, determining a desired position of the second machine 202 as a function of the first position signal, and responsively producing a desired position signal. One such system is disclosed in U.S. Pat. No. 5,546,093, issed to Gudat et al, which is herein incorporated by reference.

Alternatively, if the first machine 102 is semi-autonomous or manually operated, an operator can input the desired position.

A transmitting means 312 receives the first desired position signal and responsively transmits a desired position radio signal via a transmitting antenna 314. The transmitting means 312 includes a low power radio frequency transmitter. Preferably, the low power radio frequency transmitter is a narrow-band transmitter or a spread-spectrum transmitter.

A controlling means 320 on-board the hauling machine 202 includes a second positioning means 322. The second positioning means 322 determines the position of the second machine 202 and responsively produces a second position signal. In the preferred embodiment, the second positioning means 322 is a differential or kinematic GPS system. The second positioning means 322 includes a third GPS antenna 324 for receiving electromagnetic signals from GPS satellites. A second GPS receiving means 326 is connected to the third GPS antenna 326. The GPS receiving means 324 includes a GPS receiver. A GPS processing means 332 receives signals from the GPS receiver and preferably from a base station and/or pseudolites and responsively determines the position of the hauling machine 202.

The controlling means 320 also includes an RF receiving antenna 327 for receiving the desired position radio signal transmitted by the first positioning means 302. The RF receiving antenna 327 is coupled to an RF receiving means 328. The RF receiving means 328 preferably includes an RF receiver.

A navigation means 330 receives a position signal indicative of the position of the hauling machine 202 from the second positioning means 322 and the desired location signal from the RF receiving means 328 and responsively generates a path.

With reference to FIGS. 4 and 5, the present invention provides a method for automatically determining the path between a predetermined route and a desired position. The desired position includes a desired location, preferably in Cartesian coordinates $(x_f, y_f)$, and a desired heading $(\Theta_f)$.

In the preferred embodiment, as shown in FIG. 4, locations are measured in Cartesian coordinates with respect to a predetermined point on a machine 402. The machine 402 is facing in the direction as shown by arrow 404. The machine's heading is measured as the angle $(\Theta)$ between the arrow 404 and a line parallel with the X axis.

With reference to FIG. 5, the second machine 202 is adapted to follow predetermined route 502. The present invention is adapted to determine the path 504 between an initial position 506 and a final position 508. The initial position 506 includes an initial location defined by Cartesian coordinates $(x_0, y_0)$, and an initial heading $(\Theta_0)$. In the illustrated embodiment, it is presumed that the second machine 202 is to back up into the desired position 508. However, the invention may be adapted to allow for the machine to go forward into the desired position.

With reference to FIG. 6 in the preferred embodiment, the present invention is embodied in software. Preferably, the software is run on a microprocessor based control module, for example, the navigation means 330 on board the second machine 202.

The flow chart shown in FIG. 6 illustrates the general operation of the software according to an embodiment of the present invention.

In a first control block 602, the initial and final positions are determined and the design parameters are preselected. For instance the design parameters include the maximum curvature, maximum distance, maximum difference in heading and the maximum number of points in the path, as used below.

In the preferred embodiment, the final position is given by an external source. For example, the final position may be transmitted to the second machine 202 from a remote base station or from the first machine 102.

In the preferred embodiment, the initial position is chosen as a function of the final position and the route 502. Preferably, the route 502 is mathematically modeled, e.g., by a B-Spline. First, the point $(S_0)$ on the route 502 closest to the desired position $(x_f, y_f, \Theta_f)$ is determined. The heading of the second machine 202 at $S_0$ is also determined.

The final location 508, as shown in FIG. 5 appears on the right side of the route 502, however, the final location 508 may also appear on the left side of the route 502.

Starting at $S_0$, a sample point in Cartesian coordinates along the route 502 is determined. The heading of the machine at the sample point is determined from the model of the route 502. The sample point and the heading constitute the sample position.

The sample point must then be validated. The sample point is valid if either the sample heading varies from the heading at $S_0$ by more than a predetermined angle, e.g., 5 or 10 degrees, or the distance between the sample point and $S_0$ is greater than or equal to a predetermined distance, e.g., 15 meters. If the sample point is not valid, then another sample point is chosen. In the preferred embodiment, the sample points are separated by 5 meters along the route.

For example, in FIG. 5 the first sample point ($S_1$) is chosen as being the point 5 meters from $S_0$. If S1 is not valid then a point (S2) further along the predetermined path is chosen. If the heading of the machine 202 at S1 or S2 does not vary from the heading of the machine at $S_0$ by more than the predetermined angle then the sample points are not valid because the distance between the sample points and $S_0$ are less than 15 meters. However, even if the difference in the heading of the second machine 202 at $S_3$ is less than the predetermined angle, the sample point is valid because its distance from $S_0$ is equal to 15 meters.

Once a valid sample point has been selected, the initial location is set as the valid sample point. The heading of the second machine 202 at the valid sample point is set as the initial heading.

After the initial and final positions have been determined, control proceeds to a second control block 604. In the second control block 604 a set of path equations are determined.

Wheeled vehicles are nonholonomic systems, meaning that the constraints present on the system cannot be expressed by integrals or integrable equations.

The nonholonomic constraint equation for the wheel of the machine 102 can be expressed as:

$$-\dot{x} \sin \theta + \dot{y} \cos \theta = 0 \qquad \text{Equation 1.}$$

The motion planning problem is defined as finding three functions, $\chi(t)$, $y(t)$, $\theta(t)$, which satisfy the following conditions:

(1) nonholonomic constraints:

$$-\dot{\chi} \sin \theta + \dot{y} \cos \theta = 0 \qquad \text{Equation 2.}$$

(2) initial conditions:

$$\chi(t_0) = \chi_0, \ y(t_0) = y_0 \text{ and } \theta(t_0) = \theta_0 \qquad \text{Equations 3A, 3B, and 3C.}$$

(3) terminal conditions:

$$\chi(t_f) = X_f, y(t_f) = y_f \text{ and } \theta(t_f) = \theta_f \qquad \text{Equations 4A, 4B, and 4C.}$$

The path planning problem with the nonholonomic constraints can be restated as the problem of obtaining the control inputs $r_1$ and $r_2$ such that the states of the system described by Equation 2 moves from an initial location $(x_0, y_0, \Theta_0)$ to a final or desired location $(x_f, y_f, \Theta_f)$.

Using Equation 1 and the above assumptions, the system can be described as:

$$\frac{d}{dt} \begin{bmatrix} x \\ y \\ \theta \end{bmatrix} = \begin{bmatrix} \sin\theta \\ \cos\theta \\ 0 \end{bmatrix} r_1 + \begin{bmatrix} 0 \\ 0 \\ 1 \end{bmatrix} r_2 \qquad \text{Equation 5.}$$

where $r_1$ and $r_2$ are the two control inputs, i.e., the linear velocity and angular velocity, respectively.

Converting Equation 2 into integral equations, leaves:

$$x_f - x_0 = \int_{t_o}^{t_f} r_1(t) \cos\theta(t) dt, \qquad \text{Equation 6.}$$

$$y_f - y_0 = \int_{t_o}^{t_f} r_1(t) \sin\theta(t) dt, \qquad \text{Equation 7.}$$

$$\theta_f - \theta_0 = \int_{t_o}^{t_f} r_2(t) dt \qquad \text{Equation 8.}$$

The next step involves defining a cost function which minimizes the two control inputs and is given by:

$$J(r_1, r_2) = \int_{t_o}^{t_f} (r_1^2 + r_2^2) dt \qquad \text{Equation 9.}$$

The two control inputs are obtained by minimizing the cost function using the constraints given in Equations 2, 3A, 3B, 3C, 4A, 4B, and 4C. The Lagrangian function is defined as:

$$L(r_1, y_2) = r_1^2 + r_2^2 + \lambda_1 r_1 \cos\Theta + \lambda_2 r_1 \sin\Theta + \lambda_3 r_2 \qquad \text{Equation 10.}$$

where, $\lambda 1$, $\lambda 2$, and $\lambda 3$ are constants. Substituting the above equation in the Lagrange-Euler equations, the two control inputs are given by:

$$r_2 = -1/2 \lambda_3 = \frac{\theta_f - \theta_o}{t_f - t_o} \qquad \text{Equation 11.}$$

$$r_1 = \gamma_{11} \sin\theta + \gamma_{22} \cos\theta \qquad \text{Equation 12.}$$

where $\gamma_{11}$ and $\gamma_{22}$ are constants.

Using the boundary conditions, the desired trajectory in Cartesian coordinates is given by:

$$x = x_0 + (t - t_o) \left[ -\gamma_{11} \, 1/4 \frac{\cos 2\theta - \cos 2\theta_o}{\theta - \theta_o} + \gamma_{22} \left( 1/2 + 1/4 \frac{\sin 2\theta - \sin 2\theta_o}{\theta - \theta_o} \right) \right] \qquad \text{Equation 13.}$$

$$y = y_0 + (t - t_o) \left[ -\gamma_{11} \left( 1/2 - 1/4 \frac{\sin 2\theta - \sin 2\theta_o}{\theta - \theta_o} \right) + \gamma_{22} \left( 1/4 \frac{\cos 2\theta - \cos 2\theta_o}{\theta - \theta_o} \right) \right] \qquad \text{Equation 14.}$$

Preferably, the number of points along the path 504 is predetermined. From the number of points, the time intervals can be determined.

The solution to the nonholonomic path planning problem represented by Equations 13 and 14 is discussed in further detail in "Path Planning and Control of a Mobile Base with Nonholonomic Constraints", *Robotica*, volume 12, pp 529–539, which is herein incorporated by reference. This solution is only one possible solution. Other solutions may be substituted without departing from the spirit of the invention.

In a third control block 606, the Cartesian coordinate of the points along the path 504 are determined using the time intervals and Equations 13 and 14.

In a fourth control block 608, the path 504 is mathematically modeled using the generated path points. In the preferred embodiment, the path 504 is modeled using B-Splines. However, other modeling techniques may be used without departing from the spirit of the invention. B-Spline modeling is well-known in the art and is therefore not discussed further.

In a fifth control block 610, a control point is initialized to the first path point along the path 504. In a sixth control block 612, the curvature of the path 504 at the control point is determined. In the preferred embodiment, the path is modeled by a B-Spline and the curvature is determined by:

$$\tau = \frac{\left(\frac{dx}{dt}\right)\left(\frac{d^2y}{dt^2}\right) - \left(\frac{dy}{dt}\right)\left(\frac{d^2x}{dt^2}\right)}{\sqrt{\left(\frac{dx}{dt} + \frac{dy}{dt}\right)^3}} \quad \text{Equation 15.}$$

where $dx/dt$, $dy/dt$, $d^2x/dt^2$, and $d^2y/dt^2$ denote the first and second time derivatives of the B-Spline.

In a first decision block 614 the determined curvature at the control point is compared with a maximum curvature based on the geometry of the second machine 202. If the curvature of the B-Spline at the control point is greater than the maximum, then control proceeds to a seventh control block 616. If the curvature is less than or equal to the maximum curvature, the control proceeds to an eighth control block 618.

In the eighth control block 618, the control point is incremented to the next path point along the path 504. In a second decision block 620, if the curvature of the last control point has already been validated then the whole path as defined by the B-Spline is valid and control ends. Otherwise control returns to the sixth control block 612.

If in the first decision block 614, the curvature at the control point was greater than the maximum curvature, control proceeded to the seventh control block 616. Thus, the path generated is not valid. A new initial location along the route 502 must be determined and a new path 504 from the new initial location to the final position must be determined and validated.

In the preferred embodiment, if the original initial position was determined as a function of distance, then the new initial position is set as being the predetermined distance from the last initial position. If the original position was determined as a function of angle, then the new position is set as having a predetermined difference in heading from the last initial position.

In a third decision block 622, the new initial location is validated against one or more maximum constraints. For example, the new initial location may be validated against a maximum distance from $S_0$ constraint and/or a maximum difference in heading constraint. If the maximum constraints are violated then no valid path exists for the final location and heading from the route and control proceeds to an eighth control block 624.

If the maximum constraints are satisfied, then the new initial position is valid and control returns to the second control block 604. The process is then repeated until a valid path is determined.

The generated path may be displayed and/or used for automatic navigation of the second machine.

Industrial Applicability

With reference to the Figs. and operation, the present invention is adapted to automatically determine and model a path between a predetermined route and a final position. For example, the present invention may be used in a situation where a first vehicle (102) (a loading machine) is utilized to load material into a second machine (202). The second machine (202) is preferably an autonomous machine and adapted to follow a predetermined route. The first machine (102) operates in a local area and when appropriate generates a final desired position for the second machine (202). The final desired position represents the position at which it is most efficient for the first machine (102) to load the second machine (202). Generally, the final desired position is not on the predetermined route and thus the path from the route to the final desired position must be generated.

The final desired position is generated at the first machine (102) and transmitted from the first machine (102) to the second machine (202). The second machine (202) receives the final desired position and automatically generates a path to travel which begins at an initial position on the route to the final desired position. The initial position and final desired position include Cartesian coordinates and a heading.

Using the process discussed above, the present invention generates a path and models the path which the second machine (202) is physically able to traverse.

Other aspects, objects, and features of the present invention can be obtained from a study of the drawings, the disclosure, and the appended claims.

I claim:

1. A method for automatically determining and modeling a path between a route and a final position, the final position including a final location and a final heading, comprising:
    (a) determining an initial position on the route using a position determining system, said initial position including an initial location and an initial heading;
    (b) determining a set of path equations between said initial position and the final position;
    (c) computing a set of path data points using said set of path equations;
    (d) determining a model of the path as defined by said path data points;
    (e) determining the curvature of the path at each of said path data points using said model;
    (f) determining an other initial position and repeating steps (b)–(e) if said curvature at any path data point is greater than a predetermined curvature.

2. A method, as set forth in claim 1, wherein said step of determining an initial position on the route includes the steps of:
    (a)(1) determining the point on the route ($S_0$) closest to the final position;
    (a)(2) determining a sample point a first predetermined distance from $S_0$ along the route;
    (a)(3) validating said sample point;
    (a)(4) choosing another sample point and repeating step (a)(3) if said sample point is not validated; and
    (a)(5) setting the initial position equal to a validated sample point.

3. A method, as set forth in claim 2, wherein said step (a)(3) includes the step of validating said sample point if one of the following is true: a heading at said first sample point varies from a heading at $S_0$ by at least a predetermined angle and said sample point is a second predetermined distance from $S_0$ along said route.

4. A method, as set forth in claim 1, wherein said set of path data points in step (c) is of a predetermined number.

5. A method, as set forth in claim 1, wherein said model of the path of step (d) is a B-Spline.

6. A method, as set forth in claim 1, wherein said other initial position of step (f) is determined as a point a predetermined distance from the previous initial position.

7. An apparatus for automatically determining and modeling a path between a route and a final position, the final position including a final location and a final heading, comprising:

means for generating a final position signal indicative of the final position, and, means for determining an initial position on the route, said initial position including an initial location and an initial heading; computing a set of path data points between said initial position and the final position; modeling the path defined by said path data points; determining the curvature of the path at each path data point using said model; and determining an other initial position and another path using said other initial position if said curvature at any path data point is greater than a predetermined curvature.

8. An apparatus for automatically determining and modeling a path between a route and a final position, the final position including a final location and a final heading, comprising:

a first machine;

means, located on said first machine, for generating a final position signal indicative of the final position, and, means, located on said first machine, for transmitting said final position signal;

a second machine, said second machine adapted to traverse the predetermined route;

means, located on said second machine, for receiving said final position signal;

means, located on said second machine, for determining an initial position on the route, said initial position including an initial location and an initial heading; computing a set of path data points between said initial position and the final position; modeling the path defined by said path data points; determining the curvature of the path at each path data point using said model; and determining an other initial position and an other path using said other initial position if said curvature at any path data point is greater than a predetermined curvature.

* * * * *